Fig. 2.

INVENTORS
LEONARD W. ZAHNSTECHER
JOHN F. MIDDLETON
FREDERIC M. PYZEL
PAUL I. OLSEN
BY Richard H. Thomas
ATTORNEY

ETHYLBENZENE SEPARATION
WALL & TRAY AREA VS OVERHEAD PRESSURE
REFLUX RATIO $L_0/D = 80$
FEED RATE 181 MOLES PER HOUR

Fig. 5.

INVENTORS
LEONARD W. ZAHNSTECHER
JOHN F. MIDDLETON
FREDERIC M. PYZEL
PAUL I. OLSEN
BY
Richard H. Thomas
ATTORNEY United States Patent Office 3,281,337
Patented Oct. 25, 1966

3,281,337
FRACTIONATION OF C$_8$-AROMATICS
Leonard W. Zahnstecher, Livingston, N.J., and Frederic M. Pyzel, Rye, Paul I. Olsen, Brooklyn, and John F. Middleton, Roslyn Heights, N.Y., assignors to Foster Wheeler Corporation, New York, N.Y., a corporation of New York
Filed May 29, 1963, Ser. No. 284,071
9 Claims. (Cl. 203—80)

This invention relates to an improvement in superfractionation, and in particular to an improved method and apparatus for separating the components of liquid mixtures by distillation where the volatility differences between the components are small.

When the differences in the relative volatilities of components of a mixture are small, the separation is difficult requiring hundreds of distillation trays and very high reflux ratios, making both capital investment and utility consumption very high; hence, the term "superfractionation." Typical examples of such "superfractionations" are the separation of ethylbenzene from its mixtures with xylenes and the separation of ortho-xylene from meta-xylene. Until recently, the difficulty in separating these components by fractionation has discouraged use of the method.

In a recent publication (Weedman, J. A. M., and Findley, R. A., in Petroleum Refiner, vol. 37, No. 11, p. 195, November 1958), there is described an installation for separating ethylbenzene from para-xylene in a 350 tray tower, and ortho-xylene from meta-xylene in a 150-tray tower. Schematically these separations are shown as single towers. Actually, for practical construction and operating purposes, the towers are usually split into multiple towers, each having 60 to 110 trays. A single reboiler and a single condenser are provided for the multiplicity of towers constituting the whole column.

One of the characteristics in the design of a distillation tower having a large number of trays is the very large pressure drop required for effective operation. For reasonable effectiveness, each tray should have 2″ to 6″ of water pressure drop, which means that a 300-tray tower may have a pressure drop of 20 to 60 lbs. per square inch. The high pressure drop forces the designer to operate the lower part of the column at a high absolute pressure. If the top of the column operates at atmospheric pressure, the bottom may well operate at 4 to 6 atmospheres. This has the following disadvantages:

(1) A high pressure in the lower section of the column increases the difficulty of bottoms separation, since increasing pressure always reduces the relative volatility between components.

(2) A high pressure at the base of the tower increases the boiling point above that which can be obtained at low pressure. This is a disadvantage when distilling a heat sensitive material. Also, since a high reboiler temperature requires the use of a high temperature heating medium, costs may become excessive. An extremely high temperature also means that the bottom product boiling point may be approaching a critical temperature at which separation is impossible.

It is a well-known fact in the art of distillation that the bubble tray and reflux requirements for a particular separation are dictated by the most difficult part of the separation. In the distillation tower, compositions of the reflux streams change fairly rapidly from tray-to-tray in the vicinity of the ends of the column, but at points removed from the ends, changes of composition per tray become smaller and in extreme cases the compositions of streams at adjacent trays may approach a constant value. When the separation is difficult, or if the reflux ratio is near the minimum required for the separation, the region of nearly constant composition occupies a large number of trays above and below the feed tray. This part of the distillation is referred to as the "pinch section" and in effect controls the reflux ratio required to achieve separation; i.e., the reflux required for the separation must be applied to the part of the system containing the composition "pinch." In multicomponent distillations, the pinch region is also associated with maximum values for the concentration of one of the components in the reflux streams and the pinch region is generally situated between the two bubble trays where maxima occur. There will be a maximum concentration and a "pinch" for one of the components in the rectification area above the feed tray and a maximum concentration and "pinch" for one of the other components in the stripping area below the feed tray, with the maxima relatively close to the feed tray but defining the pinch region.

Since the separation of the hydrocarbon ethylbenzene from its mixture with xylenes is an extremely difficult one, and because of the demand for extreme purity in the ethylbenzene product, it was felt to be an ideal subject for investigation of the superfractionation process, and also is believed to be an ideal example for the purpose of illustrating the invention to which this application relates. However, it should be understood that the principles of the invention can successfully be applied to any distillation problem wherein the components are difficult to separate and which, because of the smallness of the difference between their relative volatilities, requires large numbers of distillation trays and extremely large reflux ratios.

During the course of the investigation of the separation of the hydrocarbon ethylbenzene from its mixture with xylenes, it was found that the "pinch" region for this distillation always occurs between the tray numbers at which the particular component para-xylene passes through its maximum concentration in the two sections of the column above and below the point of feed entry. It was then found that the number of trays between either of the two points of maximum concentration of para-xylene and the end of the column nearest to it was essentially independent of the reflux ratio, and further that the number of trays located outside of the "pinch" region was relatively insensitive to changes in operating pressure in both sections of the column, in contrast with the wide variation of the number of trays in the "pinch" region with pressure.

It was then realized that if the trays outside of the "pinch" region were independent of reflux, and that if these trays were placed in separate columns from the "pinch" region by arranging the equipment in an appropriate way, they could be operated under considerably lower refluxes than would be needed in the "pinch" section to effect the separation.

At the same time, the same arrangement of equipment can be used to operate the parts of the multiple column assembly outside the pinch region at higher pressures than the optimum pressure required for the pinch section.

This permits operating outside of the "pinch" region at low reflux rates and high pressures with considerable reductions in the sizes of the equipment involved. At the same time the segregation of the pinch section into a separate vessel automatically reduces it to the minimum number of trays needed for that part of the operation with a corresponding benefit in minimizing the effect of pressure drop.

Accordingly, it is proposed by the invention to provide in a superfractionation process a plurality of fractionating columns or towers, preferably three or four, the columns constituting the rectifying, "pinch" and stripping sections of the installation. In place of the conventional single or total reboiler and single or total condenser generally provided, there is provided a main reboiler plus at least one additional auxiliary reboiler, and a main condenser plus at least one additional auxiliary condenser for the plurality of columns.

These columns are arranged to be operated semi-independently of each other at different reflux ratios and column pressures, the reflux ratio being highest and the pressure the lowest in the "pinch" section where the separation is most difficult. Other parts of the system are operated at higher pressures and lower reflux ratios achieving considerable economies in the operation of and in the sizes of the equipment.

This is particularly important in the separation of ethylbenzene from its mixtures with xylenes because of the very large number of trays required for the separation and the large sizes of equipment required to accommodate the high rates of reflux.

In actual practice, a fewer number of reboilers and condensers than columns are usually employed. In addition, auxiliary reboilers and condensers will not likely be sized for the whole heat duty of the column unless proven to be more economical than pumping and compressing of the interchanging streams, otherwise required. From the point of view of heat duty, the intermediate auxiliaries need be sized only for fractions of the maximum heat duty.

In the separation of liquid mixtures whose components possess only small differences of relative volatility, the column of the series which houses the "pinch" section requiring the highest reflux, operates at an optimum pressure representing a compromise between a larger number of trays with a small heat duty and a smaller number of trays with a high reflux rate. At the same time, the terminal columns operate at higher pressures to give minimum size vessels having greatly reduced but still adequate reflux capacity.

Use of the invention to fullest advantage may also lead to columns of unequal height having an unequal distribution of trays. This is because the highest reflux is concentrated in the part of the system containing the composition "pinch," leaving the balance of the required trays to be installed in other vessels. Since the tray requirements of the rectifying and stripping sections outside the "pinch" region are not necessarily equal to that of the "pinch" column, nor to each other, the occurrence of columns of equal height in installations using this invention would be purely coincidental.

The invention and advantages thereof will become more apparent upon consideration of the following specification, with reference to the accompanying drawings, in which.

Figure 1:
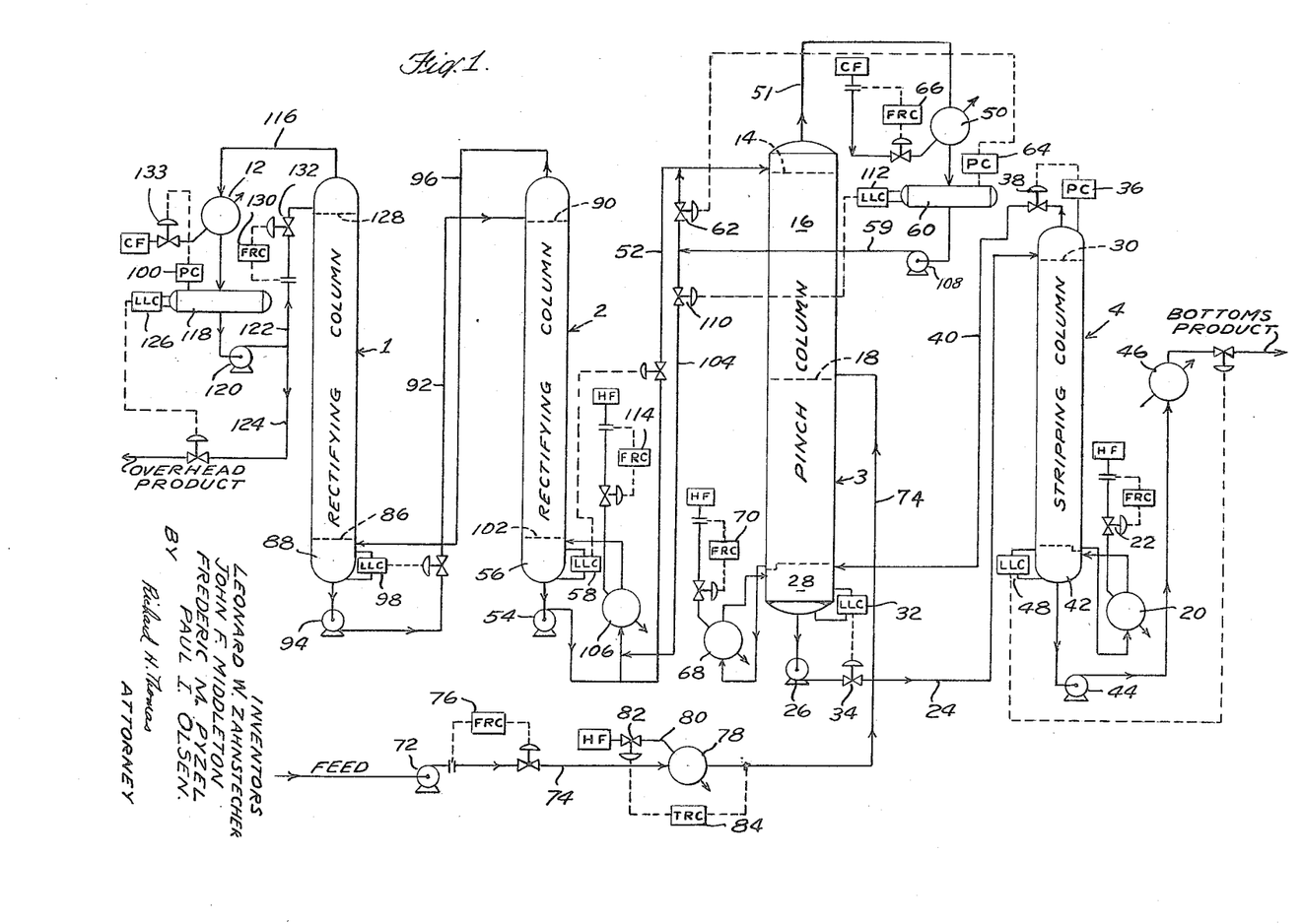
FIGURE 1 is a schematic flow diagram of one embodiment of the invention.

Referring to FIG. 1, the arrangement of equipment proposed in accordance with the invention comprises vessels or columns, Nos. 1 and 2, which form that part of the rectifying section of the fractionator between and overhead product and reflux condenser 12 on vessel No. 1 and the top tray 14 of the system "pinch" section. The "pinch" section is broadly resignated by the numeral 16 and located in a third vessel of column No. 3. The vessel or column No. 3 usually contains all of the trays of the "pinch" section 16 including a feed tray 18. A fourth vessel or column No. 4 has all of the trays of the system stripping section which are not included in the "pinch" section.

The fractionating columns are cylindrical steel vessels supported in a vertical position. Each vessel contains a plurality of horizontal decks installed at convenient spacings in the range of 1 to 3½ feet with a downcomer attached to each deck for downward passage of liquid from one deck to the next one below and arranged so that the liquid flows transversely from one side to the other completely across each deck. Each deck is also provided with either perforations, bubble caps, valves or other passages to allow flow of vapor vertically upwards through each deck. The vertically flowing vapor is thus brought into intimate contact with the liquid descending from above as it flows horizontally from one downcomer to the next. In this way, an interchange of components occurs between liquid and vapor streams, the more volatile components tending to rise in the vapor stream and the less volatile ones tending to flow downwards in the liquid stream. Each level of contact between the two phases is referred to as a "bubble tray" or "tray."

It is contemplated that the vessels, Nos. 1 and 2, of the rectifying section, will be operated at a low reflux rate (the section being relatively insensitive to changes in reflux ratio) and at a relatively high pressure, permitting greatly reducing the size of the section, and equipment associated therewith. If the number of trays in the rectifying section, excepting those which may be installed in the "pinch" column No. 3, is less than 100, these could be contained within a single vessel or column but, in many instances, it is expected that the trays above the "pinch" in the rectifying section will be so numerous as to require the two vessels as shown in FIG. 1 operating in series to avoid an excessive height.

The stripping column, No. 4, containing the trays of the stripping section below the "pinch" region, will be reduced in size, as with the rectifying towers, being operated at a low reflux ratio and at a high pressure. When high purity ethylbenzene is separated from its mixtures with the xylenes by conventionally designed superfractionation, it is found that the section of the superfractionator corresponding to the trays installed in column No. 4 of FIG. 1 is shorter than any of the other sections which correspond to column Nos. 1, 2 and 3 of FIG. 1. Accordingly, column No. 4 affords the opportunity to install many more additional trays within its shell without exceeding height limitations than is feasible in the other columns. This permits the operation of column No. 4 at higher pressures than any of the others since whatever additional trays may be required to effect the separating duty of the column at the higher pressure, they can be easily accommodated without exceeding the structural limitations imposed by height. Consequently, the combined effect of the relatively high pressure operation, the low reflux requirement, and the few stripping trays needed outside the pinch section is to cause column No. 4 to be the smallest both in diameter and height of the four columns required in the superfractionator separating ethylbenzene.

Associated with the stripping column (No. 4) is the reboiler 20 which provides the heat required for the column, governed by the reflux requirements for the stripping section trays outside the "pinch" region; i.e., the bubble trays installed in column No. 4. The heat flow to reboiler 20 is regulated at a constant predetermined rate by means of a flow controller 22 which acts on the supply of constant enthalpy heating fluid to cause it to circulate through the reboiler at a constant rate. Compared with the heat duty of a reboiler used in a comparable conventional arrangement of superfractionating columns, that of reboiler 20 is expected to be quite small. The reflux for the column No. 4 is obtained through a line 24 and a transfer pump 26, the former leading from the accumulation section 28 in the bottom of the "pinch" column No. 3 to the top tray 30 of column No. 4.

The rate of flow of reflux from the accumulation section 28 to the top tray 30 of column No. 4 is regulated by means of a liquid level controller 32 situated in the accumulation section 28 of column No. 3, operating control valve 34 in transfer line 24.

Because of the complexity of the superfractionator illustrated in FIG. 1 and the need to maintain strict uniformity of operation, it is essential that the operating pressure of each vessel be controlled at an appropriate constant value in each case. This function is provided for in column No. 4 by pressure controller 36 which, in FIG. 1, is shown to operate a valve 38 in the vapor line 40 which conducts vapor from the top of column No. 4 to the bottom of column No. 3. However, it will be understood that the operation of the plant of the invention need not be restricted to this method of pressure control for column No. 4.

The bottom product separated in the plant is removed from the accumulator space 42 in the bottom of column No. 4 by pump 44 by which it is transferred to storage (not shown), after first passing through the heat exchanger 46 which cools the stream to a suitable temperature for storage. The rate of flow of bottoms product is regulated by a liquid level controller 48 in the accumulation space.

Ideally, the "pinch" column No. 3 contains all the trays included in the "pinch" section and none of the additional trays required for the separation that are situated above and below the "pinch." For practical reasons of construction, there will frequently be some slight deviation from this ideal, but the intention is, in general, to adhere to it as closely as possible.

This unit of the assembly of columns is the critical one for the selection of the reflux ratio and the consequent heat input required to operate the plant. In essence, its operation is the same as that of the "pinch" section of a conventionally operated superfractionator, consisting of three or four columns, except that the operating pressure can, and will, be less since it is operated semi-independently of the large number of trays which lie between the top of the "pinch" section and the top of the rectifying section. Because of the lower operating pressure, the relative volatilities between components will be larger in the segregated "pinch" region than they would be in the "pinch" region of a conventionally operated superfractionator separating the same components. This results in the reflux requirements and the number of installed trays being less, and the overall size being smaller, for the "pinch" column of the invention than for the analogous section in a conventionally operated superfractionator when separating liquid mixtures of comparable composition.

In this respect, the number of trays in the "pinch" section is sensitive to the pressure, but, again, since the diameter of the vessel tends to decrease with the pressure while the number of trays increases, the overall size of the "pinch" column No. 3 tends to approach a minimum at some specific operating pressure. (In the ethylbenzene separation from xylenes, the minimum column size occurs in the range of 10 to 20 p.s.i.a.) The operating pressure of the pinch column No. 3 is, therefore, determined by the operating conditions which give the minimum size vessel. The columns Nos. 1, 2, and 4 will operate at higher pressures than column No. 3.

Concerning reflux requirements for the "pinch" section, a well-known phenomenon of distillation is the existence of a minimum value for the reflux required in a given separation of components. If less than the minimum requirements of reflux are supplied to a column, the separation cannot be obtained however numerous the stages of contact between phases. At the minimum reflux, although the separation is theoretically feasible, the operation is impracticable because an infinite number of contact trays would be required. Similarly, values of reflux close to the minimum cannot be used in practical operations since the number of trays required would be excessive. In general practice, economically feasible reflux ratios are found to lie in a range of values between 1.15 and 2.0 times the minimum value. In superfractionation, the exceedingly high reflux rates required cause the practical choice to lie in the low end of the range cited, for instance, between 1.15 to 1.25 times the minimum. Reflux at this level for conventional installations is applied to the top tray of the rectifying section and the single reboiler connected to the bottom end of the stripping section supplies all the heat necessary to vaporize it. In the superfractionator of this invention, reflux in the range of 1.15 to 1.25 times the minimum is applied only to the "pinch" column No. 3.

The largest part of this reflux is produced by condensation of all vapor leaving column No. 3 via line 51, in condenser 50 on the pinch column, and a small part is delivered from the rectifying section through a line 52, by a pump 54, from the accumulator section 56 in column No. 2. The rate of flow of the reflux stream through the line 52 is controlled by a liquid level controller 58 situated in the accumulator space 56; whereas the rate of flow of the reflux stream discharged by pump 108 from the reflux accumulator 60 is controlled by valve 62, actuated by pressure controller 64 situated in the vapor space of drum 60. The condensate produced in condenser 50 accumulates in drum 60 and is circulated through line 59 by pump 108 in two directions, the main portion through control valve 62 towards top tray 14 of column No. 3 and a smaller portion through control valve 110 and line 104 towards reboiler 106 of column No. 2. The main portion of reflux is admitted by valve 62 to line 52 to achieve intimate admixture before entry into column No. 3 with the smaller part of the reflux being returned to column No. 3 through line 52. In this way, the pressure at the top of the "pinch" column is held at its predetermined constant value.

The condensation of vapor in the condenser 50 is effected by the circulation of a constant enthalpy cooling fluid through a tubular circuit inside the condenser at a predetermined constant rate controlled by a flow controller 66. The condensate leaving the condenser 50 is cooled substantially below its bubble point. When intermixed with the stream from column No. 2, which has a higher temperature, the mixture of the two reflux streams discharges onto top tray 14 of column No. 3 at a temperature low enough to avoid flash vaporization at the pressure maintained at that point.

The reboiler 68 connected to the bottom of column No. 3 supplies most of the heat to vaporize the combined reflux delivered to the top tray 14, but a small fraction of the heat requirement comes in the vapor stream from column No. 4 delivered by line 40 to the bottom of column No. 3.

The part of the heat duty of column No. 3 provided by reboiler 68 is carefully regulated to a constant rate by means of flow controller 70 acting on the rate of flow of the constant enthalpy heating medium circulating through it, in a similar fashion to that used for control of reboiler 20 of column No. 4. Because of the method of operation employed in the present invention, the operating temperatures of reboilers 20 and 68 will be lower than those experienced in a conventional arrangement employed in comparable service.

Since the "pinch" column No. 3 requires for its operation all the heat generated in both reboilers 20 and 68, no condenser is required in conjunction with the operation of column No. 4. Moreover, the transfer of the vapor stream through line 40 conveying all the heat supplied by reboiler 20 to the bottom of column No. 3 is effected without any blower or compressor by virtue of the higher operating pressure of column No. 4 relative to that of column No. 3.

The "pinch" column No. 3 besides performing the most critical part of the separation also provides the location for the introduction of the feed stream into the assembly of columns. In the method shown in FIG. 1 for introducing the feed stream, the feed is removed from storage (not shown) by a pump 72 which discharges it into line 74. The rate of flow is maintained constant by a flow controller 76 in the line. The feed stream passes through the preheater 78 where its temperature is raised to the bubble point, or slightly above, at the temperature prevailing at the point of feed entry, the tray 18 in column No. 3. In the preheater 78, the heating is accomplished by countercurrent flow with a constant enthalpy heating medium supplied in line 80 at an appropriate rate to maintain the feed stream at the chosen temperature. This rate is controlled by the action of a valve 82 responsive to a signal from temperature controller 84 measuring the temperature of the feed stream in line 74 downstream of the preheater. From the preheater, the feed stream proceeds through line 74 for discharge onto the feed tray 18.

It is shown in FIG. 1 that columns Nos. 1 and 2 of the rectifying section of the assembly operate as if they were a single column of a conventional distillation arrangement whose trays are placed in two separate vessels operating in series, since liquid reflux from the bottom tray 86 of column No. 1, in the accumulator section 88, is pumped directly to the top tray 90 of column No. 2 through line 92 by pump 94, while the vapor from the top of column No. 2 flows directly through the vapor line 96 to the bottom of Column No. 1 below bottom tray 86. Except for the pressure drop for the vapor flowing through line 96, the operating conditions above top tray 90 of column No. 2 are the same as those below the bottom tray 86 of column No. 1.

The vapor stream transferred through line 96 from the top of column No. 2 to the bottom of column No. 1 consists of part of the reflux entering column No. 2 through line 92, after vaporization on top tray 90 of column No. 2, in combination with the vaporized overhead product to be recovered at the top of column No. 1. The rate of flow of the reflux stream in line 92 is regulated by a liquid level controller 98 installed in the accumulator section 88.

The pressure in column No. 2 is governed by the pressure at the bottom of column No. 1, which in turn depends upon the action of a pressure controller 100 controlling the operating pressure at the top of column No. 1. In this respect, columns Nos. 1 and 2, containing most of the trays of the rectifying section, operate at a substantially higher pressure than the "pinch" column No. 3, and it is necessary to provide means for delivering the low pressure vapor from the top of column No. 3 to the region of higher pressure below bottom tray 102 of column No. 2. For this purpose, in the embodiment of the invention illustrated in FIG. 1, a branch line 104 of reflux line 59, from condenser 50 and accumulation drum 60, is provided leading to a reboiler 106 associated with column No. 2. A pump 108 in line 59 provides the higher pressure required for the condensed vapors.

The stream of condensate delivered to the reboiler 106 consists of the net overhead pure product, collected from the top of column No. 1, mixed with the vaporized reflux returned to column No. 3 through line 52. The stream flowing in branch line 104 is controlled by valve 110 actuated by liquid level controller 112 which maintains a constant liquid level in the drum 60.

The heat required for operation of the two-vessel rectifying column is supplied by the reboiler 106 which is heated by the circulation of a constant enthalpy heating medium delivered at a constant rate controlled by a flow controller 114. The heat from reboiler 106 is transferred to column No. 2 by the circulation, in a separate circuit, of a combination of liquid streams originating respectively in accumulator section 56 of column No. 2 and in reflux accumulator 60 associated with column No. 3. The former is pumped by pump 54 and the latter by pump 108, both of which simultaneously supply reflux to column No. 3, from the same reservoirs, in the manner already described. The fractional streams impelled by pumps 54 and 108 combine before entry into reboiler 106 where a substantial fraction of the total entering the reboiler is vaporized before discharge below the bottom tray 102 of column No. 2.

The vapor stream leaving the top of column No. 1 through line 116, having the composition of the pure overhead product, is completely condensed in condenser 12. The resulting liquid is accumulated in drum 118 and is removed from thereby a pump 120, which discharges the condensate in two separate streams, in lines 122 and 124. The stream in line 124 represents the net overhead product from the plant to storage (not shown), its rate of flow being regulated by a liquid level controller 126 situated in the accumulator drum 118. The part of the discharged liquid which flows through line 122 returns to the top tray 128 of column No. 1, as reflux, delivered at a previously determined constant rate regulated by means of a flow controller 130 and valve 132. The pressure controller 100 which regulates the operating pressure in the rectifying section functions in response to the pressure in the vapor space of the accumulator drum 118 through a valve 133 which controls the flow of constant enthalpy cooling fluid through the condenser 12. It will be understood that the invention is not restricted to the use of the means of pressure control for column No. 1 here described, but that any method deemed convenient for the purpose is within the scope of the invention.

Figure 2:
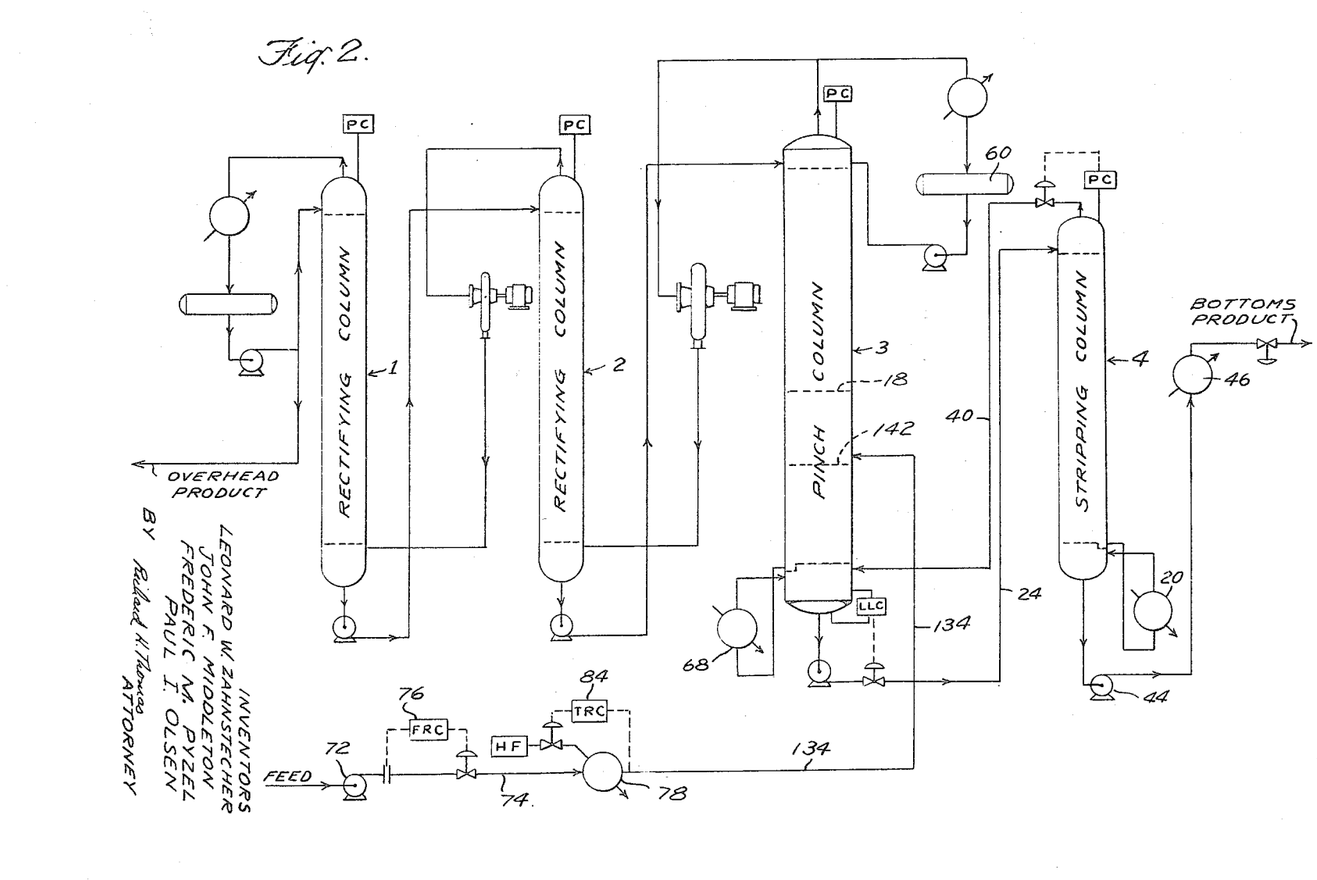
FIGURES 2, 3, 3a, and 4 are flow diagrams showing alternate methods of introducing the feed stream.
Figure 3:
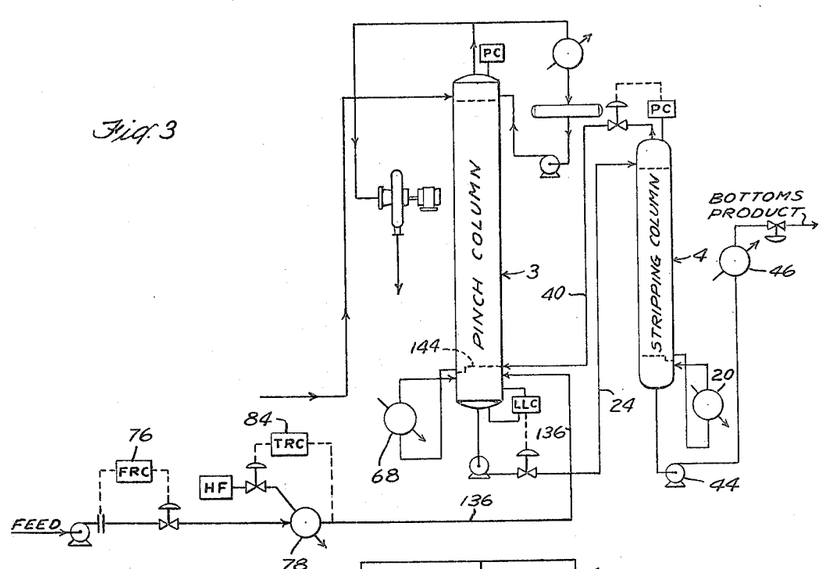
Figure 3A:
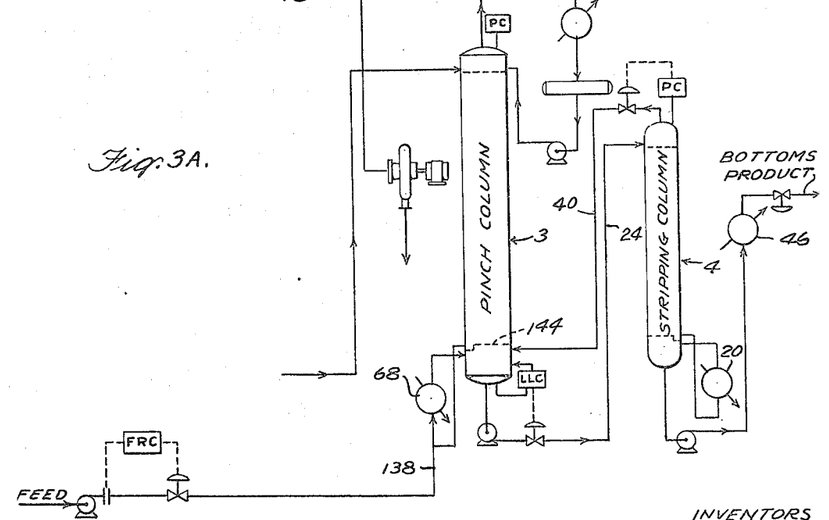
Figures 4, 6:
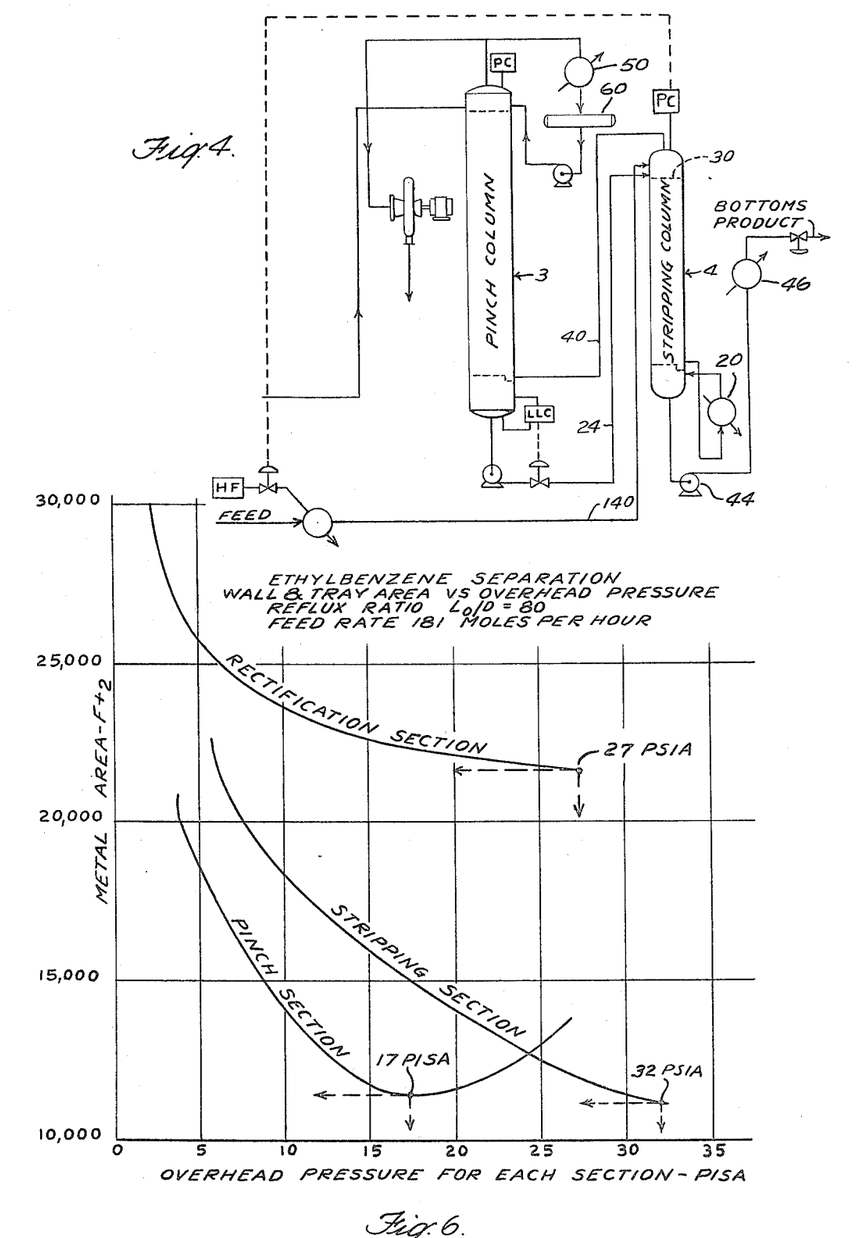
FIGURE 6 is graph illustrating the relationship between column sizes and operating pressures in accordance with the invention.

Examination of composition profiles obtained in investigation of the separation of ethylbenzene from its mixtures with the xylenes discloses that, in general, the rate of change of stream composition between one tray and the next is greater in those trays of the "pinch" section immediately above the feed tray than it is in those immediately below the feed tray. Hence, some further economy of installed trays may be achieved by lowering the point of feed entry into the "pinch" column to some tray substantially below the one used (in FIG. 1) where the feed is at its bubble point at the point of entry. This requires that the feed be preheated to a point where it will be partially vaporized upon injection into the column. FIGS. 2–4 show four alternative ways of introducing the feed into the superfractionator for the purpose of applying this observation and so further reduce the number of trays in column No. 3. The alternate connecting lines are indicated by reference numbers 134 (FIG. 2), 136 and 138 (FIGS. 3 and 3a), and 140 (FIG. 4). Other reference numbers in the figures have the same significance as they have in FIG. 1. The line 134 (FIG. 2) discharges the feed into the "pinch" column No. 3 on the tray 142 which may be twelve, or fifteen, or any other number of trays below the feed tray 18 indicated in FIG. 1. In effect, the total rectifying section will have been lengthened by the same number of trays as have been eliminated from the stripping section. However, since the trays above the feed in this region are more effective than those below, the lengthened rectifying section may perform more effectively than the same bubble trays when arranged as in FIG. 1. Conversely, the displacement downward of the point of feed entry will permit the column height to be reduced for the same separation of components as achieved in the arrangement of FIG. 1.

To accomplish this, more preheat is required in the feed when entering by line 134 than when entering by line 74 in FIG. 1. This increases the heat duty of preheater 78 (shown in FIG. 1) but a smaller duty is then required for reboiler 68 (FIG. 1), the combined heat duty of the two remaining the same.

Since the advantage of lowering the point of feed entry becomes greater as more trays are involved in the change within the limits of the "pinch" section, the greatest feasible reduction in the height of column No. 3 by this means will occur when the feed is introduced below the bottom tray 144 of column No. 3, as is shown by the alternate line 136 in FIG. 3. In this case, the feed might be vaporized to the extent of 40 to 50 percent before discharge into the column. Since the reboiler 68 discharges to the column at the same level, an identical result would be obtained if the feed were introduced directly to the reboiler 68, as indicated by line 138 in FIG. 3a. The temperature controller 84 and the preheater 78 would then be redundant, since all their functions could be performed by the reboiler 68 and its controllers.

A fourth method of introducing the feed into the superfractionator is indicated by line 140 (FIG. 4). This provides for the discharge of the preheated feed above top tray 30 of column No. 4. As far as the operation of the superfractionator is concerned, the alternatives of FIGS. 3, 3a and 4 are essentially the same, and in each case the same amount of preheat will be required for the feed. However, the introduction above top tray 30 of column 4 by line 140 (FIG. 4) affords a means of pressure control for column No. 4 which may be advantageous over that indicated in FIG. 1, and which is not otherwise available.

Figure 5:
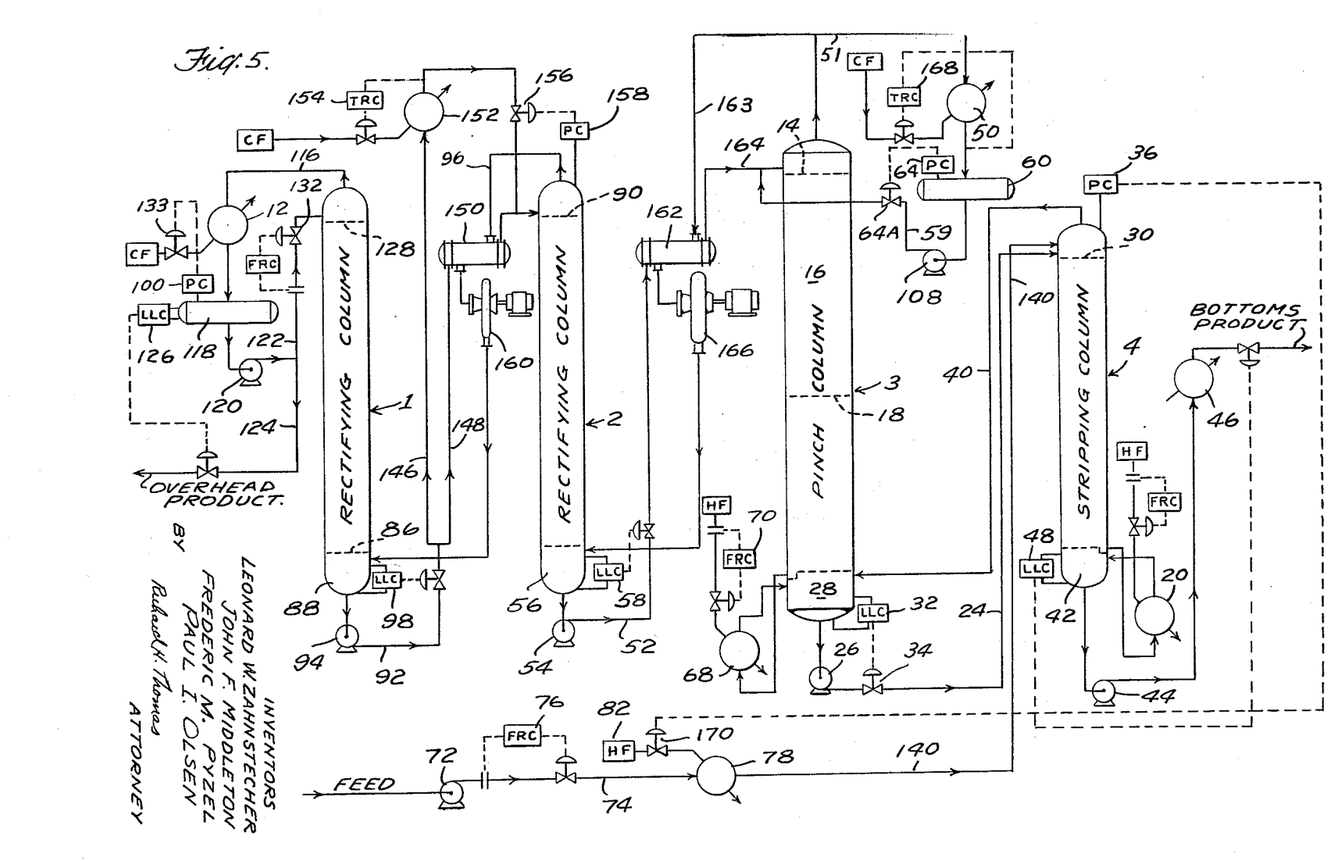
FIGURE 5 is a schematic flow diagram of an embodiment of the invention.

FIG. 5 shows another embodiment of the invention to illustrate alternate possibilities in the arrangement of the equipment for the purpose of promoting still further reductions in the sizes of the vessels and improvements conducive to greater operating efficiency. The principle changes effected in FIG. 5 in comparison with the arrangement of FIG. 1 are:

(1) Columns Nos. 1 and 2 are operatively separated to the extent that their pressures may be controlled independently of each other.

(2) The vapor and liquid streams passing between columns Nos. 1 and 2, and between columns Nos. 2 and 3 are caused to exchange heat by countercurrent passage through two heat exchangers.

(3) The pressure of column No. 4 is controlled by means of regulation of the enthalpy of the feed stream which is caused to enter the system upon top tray 30 of column No. 4.

An object of the arrangement of FIG. 1 is that the various columns be operated so that the "pinch" column has a pressure approximately the same as that which would be employed at the top tray of the rectifying section of a conventionally arranged superfractionator, while the other columns are intended to operate at pressure greater than that of the "pinch" column. As a result, there is an absence of equilibrium between the vapor and liquid streams passing in opposite directions between adjacent columns, and a vapor passing from the low pressure region at the top of a column to the bottom of the adjacent column, where the pressure is higher, can be expected to have too low a temperature to transfer its enthalpy to the liquid stream at the bottom of the column to which it is introduced. Similarly, if the vapor is compressed to match the pressure in the column which it is about to enter, condensation may ensue because the vapor enters the compressor in a saturated state. The transfer of a liquid stream from one column to the next also tends to introduce a thermodynamic inefficiency, since both its pressure and temperature are higher than is required at the top tray where it is to be discharged. In this case, flash vaporization may be expected when the stream enters the next tower. Thus, in both streams, conditions exist for promoting recycling of substantial quantities of the reflux streams between columns. These conditions, plus too low a vapor temperature, plus the difficulties arising from the condensation of vapor in the compressors, could readily defeat the objective of the superfractionation by making the operation too difficult or even impossible.

In the arrangement of FIG. 1, the only point where the above-mentioned difficulties arise is between columns Nos. 2 and 3. There, the problem is solved by totally condensing the vapor leaving the top of column No. 3 and transferring the reflux stream to the bottom of column No. 2 as a liquid. This requires an additional reboiler 106 to vaporize the reflux stream and so produce the conditions necessary for operation of column No. 2. At the same time, the handicaps associated with the excessive temperature and pressure of the reflux stream passing from column No. 2 to column No. 3 are overcome by mixing the higher temperature stream from the bottom of column No. 2 with the well-cooled reflux stream from the reflux accumulator drum 60 before it reaches the inside of column No. 3. These means are relatively simple and achieve the desired objective effectively but, both represent thermal inefficiencies which it may be desirable to eliminate. In particular, the heat which is added in reboiler 106 to the system is in duplication of part of the heat supplied by reboiler 68, but which has been removed in condenser 50. In addition, the condensate from condenser 50 removes the excess heat from the stream entering column No. 3 by way of line 52, without accomplishing any useful function with respect to column No. 3. The heat removed from these two streams represents a waste of utilities justified, however, by the relative simplicity of the arrangement.

In the following description of the superfractionator operation, as shown in FIG. 5, reference to those parts which duplicate the previous system of FIG. 1 are omitted. Referring now to FIG. 5 and starting at the pump 94 for the reflux flow from column No. 1, the liquid pumped from the accumulator region 88 flows through line 92 and splits into two branches 146 and 148. The major fraction of the flow (line 148) is delivered to the inlet side of tubes in the heat exchanger 150, around the outside of which flows the vapor stream from column No. 2 (line 96). After approaching the temperature of the incoming vapor stream, the liquid from the bottom of column No. 1 leaves the exchanger 150 to rejoin the smaller stream flowing through the branch 146 to enter column No. 2 just above top tray 90. Between the points of separation and rejoining of the branches 146 and 148, the liquid in line 146 is delivered to a cooler 152 from which it emerges at a predetermined constant temperature. The temperature is maintained at the desired level by means of a controller 154, which regulates the rate of constant enthalpy cooling fluid passing through the cooler 152. The fraction of the liquid reflux stream from the bottom of column No. 1 which passes through cooler 152 is determined by the operation of control valve 156 which operates in line 146 in response to pressure changes in column No. 2 detected by pressure controller 158. By this means, the temperature of the combined streams from lines 146 and 148 when entering column No. 2 is adjusted to the level appropriate for the maintenance of a preselected constant pressure at the top of column No. 2.

The vapor stream leaving column No. 2 through line 96 passes through the shell side of the exchanger 150 to become heated to a temperature approaching that of the liquid passing in the opposite direction. After leaving exchanger 150, the vapor stream enters the suction of compressor 160 so that it may be discharged at a sufficiently high pressure to enter column No. 1 below bottom tray 86.

The heat exchanger 162 performs the same function between columns Nos. 2 and 3 as heat exchanger 150 performs between columns Nos. 1 and 2. In this case, however, it is not necessary to add any cooler for the purpose of pressure control of the column No. 3. If the type of pressure control just described for column No. 2 is desired for column No. 3, the cooler required is already available as the condenser 50. Otherwise, the pressure control arrangement of FIG. 1, or some other convenient method, may be used.

Pump 54 removes liquid from the accumulator section 56 of column No. 2 and discharges it through line 52 to the inlet side of tubes in the heat exchanger 162 which are surrounded by the stream of vapor flowing through the shell from the top of column No. 3 via line 163. After emerging from the exchanger, at a temperature approaching that of the vapor leaving column No. 3, through line 164, the liquid stream from the bottom of column No. 2 is joined by the reflux condensed in the condenser 50 and delivered by pump 108 through line 59. The mixed stream is discharged onto top tray 14 of column No. 3. The fraction of the vapor leaving column No. 3 which is not condensed in the condenser 50 flows through the branch line 163 of vapor line 51 and passes through the shell of heat exchanger 162 where it is heated to a temperature approaching that of the liquid entering the exchanger from the bottom of column No. 2. After leaving exchanger 162 the vapor stream flows to the suction of compressor 166 which raises its pressure to a level appropriate for its entry below the bottom tray of column No. 2. The assembly for control of the operating pressure of the "pinch" column No. 3, when the heat exchange between the oppositely flowing reflux streams is used, includes the same pressure measuring and controlling device 64 as used in the superfractionator arrangement of FIG. No. 1, and the operation is essentially the same in both cases. In FIG. 5 reflux is pumped from accumulator drum 60 by reflux pump 108 through line 59 which makes a junction with line 164 so that the mixed streams of reflux, the smaller one from the bottom of column No. 2 and the major one from reflux drum 60, can be discharged in complete admixture on to the top tray 14 of column No. 3. In this case, the rate of flow of reflux through line 59 is controlled by the pressure controller 64 by virtue of its regulation of valve 64–A situated in the reflux line 59. A further essential part of the pressure control assembly is the control of heat removal in condenser 50 by means of temperature controller 168 which regulates the flow of constant enthalpy cooling fluid through the condenser 50 in such a way as to maintain a previously selected constant temperature in the stream of reflux issuing from the said condenser on its way to accumulator 60. In this way, a function analogous to that provided by the cooler 152 in the control of the pressure of column No. 2, is performed by condenser 50 for the control of column No. 3, in addition to its principal function of providing the major part of the reflux required in column No. 3.

The preheating of the feed in FIG. 5 is carried out by the exchanger 78 exactly the same as in the arrangement of FIG. 1. The method of controlling the heat input to the feed is, however, changed from a temperature control in FIG. 1 to a pressure control in FIG. 5. In each case, the method used is dictated by the peculiar requirements associated with the respective methods of introducing the feed described in each flow sheet.

The point of entry for the feed chosen for illustration in FIG. 5 is above the top tray 30 of column No. 4, which corresponds to the use of alternate line 140 of FIG. 4. In the arrangement of FIG. 5, the line 140 transfers the feed directly to the column from the outlet of preheater 78. This permits the regulation of flow control valve 170, located on the line supplying constant enthalpy heating fluid to the preheater 78, by the pressure controller 36 so that the heat input to the feed is thereby regulated to give the constant desired operating pressure for the column No. 4. If the feed were introduced on to a feed tray 18 in the "pinch" column No. 3, as shown in FIG. 1, this method of controlling the pressure of column No. 4 would not be feasible.

The advantages of the FIG. 5 embodiment should now be apparent. By passing the high temperature reflux liquid from the bottom of one column, through a heat exchanger, to be cooled by the vapor stream flowing in the opposite direction, while the latter is simultaneously heated, and subsequently compressed for entry into the bottom of the column for which it is intended, the arrangement conserves the heat in the system overcoming the difficulties due to non-equilibrium of reflux streams in the arrangement of FIG. 1. Required, however, is the addition of a blower or compressor at each point where the pressure of the vapor has to be raised for entry into the next column.

In addition, the separation of the operating control of columns Nos. 1 and 2 reduces the pressure in the second column. This improves the relative volatility relationship between components, and the total number of trays in the rectifying section comprising columns Nos. 1 and 2 will then be less than when the vessels are operated in series. A further advantage is that the pressure difference between the top of column No. 3 and the bottom of column No. 2 is reduced. However, this is balanced to some extent by the increase of the pressure difference between column No. 2 and column No. 1 in comparison with that experienced in the arrangement of FIG. 1.

The new method of controlling the operating pressure of column No. 4 presented in FIG. 5, is expected to be less costly than that given in FIG. 1. It is feasible, however, only if the feed is introduced at the top of column No. 4 and enters in a condition of partial vaporization.

FIGS. 1 through 5 have shown a number of alternative possibilities for the arrangement of the equipment and the operation of the superfractionator proposed in this invention. It is apparent that many other combinations of the possibilities shown could be suggested as well as combinations between them and other possible arrangements not shown here.

Accordingly, it will be understood that the principles of this invention may be carried out by any combination of the alternatives shown or by any other means that accomplishes the same objectives.

To further exemplify the invention, the following Table No. 1 gives a probable range of operating characteristics, for the units of FIGS. 1 and 5:

TABLE NO. 1

| | | |
|---|---|---|
| Upper Section of Rectifying Column | Pressure | 20–40 p.s.i.a. |
| | Reflux ratio: [1] Lo/D= | 20–60. |
| | Trays | 40–55. |
| Lower Section of Rectifying Column | Pressure | 20–40 p.s.i.a. |
| | Reflux ratio: Lo/D= | 20–60. |
| | Trays | 40–55. |
| "Pinch" Section | Pressure | 10–20 p.s.i.a. |
| | Reflux ratio: Lo/D= | 70–90. |
| | Trays | 40–75. |
| Stripping Column | Pressure | 25–45 p.s.i.a. |
| | Reflux ratio: Lo/D= | 10–60. |
| | Trays | 20–40. |

[1] Lo=mols per hour of internal reflux.
D=mols per hour of distilled product. (Produced as overhead product from Column No. 1)

The operating characteristics reported in Table I are derived from the conclusions reached in the investigation of the ethylbenzene-xylene separation. In this respect, FIG. 6 illustrates the varying effect of pressure on the sizes of vessels for a three-column superfractionator, for the ethylbenzene separation using a reflux ratio of $Lo/D=80$. This figure shows that the minimum size of vessel is obtained at different pressures for each section of the column. According to FIG. 6, the minimum size for the "pinch" section occurs at approximately 17 p.s.i.a. whereas the minima for the rectifying and stripping trays not included in the "pinch" section are at least 27 and 32 p.s.i.a., respectively. The operating pressure ranges given in Table I bracket these optimum pressure values.

The range of reflux ratios of Table I, for the "pinch" column, was found to be the most economic, from the study of the ethylbenzene-xylene separation. It was reasoned that the operation of the "pinch" section in a separate vessel will not influence the reflux requirements for that region, since that is the part of the distillation equipment which has the controlling influence on the reflux needed.

To illustrate further the advantages of the invention, the results of calculations for three different superfractionators designed to separate ethylbenzene from mixed xylenes are presented in the following Tables II, III and IV. In each case, the calculation is based on a feed rate to the plant of 181 mols per hour of a typical mixture of ethylbenzene with xylene isomers.

TABLE II
[Superfractionator using conventional three-column arrangement.]

|  | Column No. 1 | Column No. 2 | Column No. 3 | Totals |
|---|---|---|---|---|
| Pressure, p.s.i.a., above top tray | 17.0 | 27.2 | 37.4 | |
| Pressure below bottom tray, p.s.i.a | 27.0 | 37.2 | 47.4 | |
| Reflux Ratio: Lo/D | 80 | 80 | 80 | |
| Number of Trays (75% eff.) | 87 | 87 | 87 | 261 |
| Height of Column, ft | 138 | 138 | 138 | |
| Diameter, ft | 11½ | 11 | 10 | |
| Cross section, ft.² | 103.8 | 95.1 | 78.6 | |
| Area of trays and ends | 9,240 | 8,460 | 7,000 | 24,700 |
| Perimeter (Pi D) | 36.1 | 34.6 | 31.4 | |
| Wall area, ft.² | 4,980 | 4,770 | 4,330 | 14,080 |
| Total Metal area, ft.² | 14,220 | 13,230 | 11,330 | 38,780 |
| Reboiler heat supplied | No | No | Yes | |
|  |  |  |  | 100% |

The reflux ratios for the rectifying and stripping trays outside the "pinch" section were estimated by extrapolation. The investigation clearly showed that the numbers of trays in these parts of the equipment were independent of the reflux ratio over the range studied, but the lowest value of the reflux ratio over which the independence would be valid was not determined. However, if the lowest limit in Table I of the independence from reflux ratio is violated, it is reasonable to expect it may be compensated for by the use of more bubble trays than are indicated by the distillation calculations carried out for the pressure assumed for the "pinch" column. Consequently, the minimum tower size for these two columns may exist at some reflux ratio at which the number of trays is again dependent on the reflux ratio. The numbers of trays in each vessel of the superfractionator are obtained directly from the results of the aforesaid investigation.

Table II presents the results obtained for a conventionally designed superfractionator consisting of three vessels of equal height operating in series as a single distillation column, in which the reflux ratio is assumed to be: $Lo/D=80$.

TABLE III
[Three-column superfractionator with "pinch" trays in middle column and each column operating at its own optimum pressure.]

|  | Column No. 1 | Column No. 2 | Column No. 3 | Totals |
|---|---|---|---|---|
| Pressure above top tray, p.s.i.a. (from Fig. 6) | 28 | 17 | 33 | |
| Pressure below bottom tray, p.s.i.a | 45.2 | 27.0 | 37.7 | |
| Reflux ratio: Lo/D | 80 | 80 | 80 | |
| Number of Trays | 150 | 87 | 41 | 278 |
| Height of Column, ft | 232½ | 138 | 69 | |
| Diameter, ft | 9½ | 11½ | 9 | |
| Cross-section, ft.² | 70.9 | 103.8 | 63.6 | |
| Area of Trays and ends | 10,770 | 9,240 | 2,740 | 22,750 |
| Perimeter (Pi D), ft | 29.9 | 36.1 | 28.3 | |
| Wall area | 6,950 | 4,980 | 2,165 | 14,095 |
| Total Metal Area, sq. ft | 17,720 | 14,220 | 4,905 | 36,845 |
| Reboiler heat supplied | No | Yes | Yes | |
|  |  |  |  | 95% |

Table III represents essentially the arrangement of FIG. 1 since column No. 1 of the table corresponds to the combined operation of columns Nos. 1 and 2 of FIG. 1 and columns Nos. 2 and 3 in the table are the same as columns Nos. 3 and 4, respectively of FIG. 1.

Table III presents results for an identical separation in a superfractionator also consisting of three vessels, but utilizing two of the principles employed in this invention, namely: the segregation of the "pinch" trays into the middle one of the three vessels, and the application of higher than the optimum pressure to the columns containing the rectifying and stripping trays not included in the "pinch" section. In Table III, the reflux ratio is also: $Lo/D=80$ in each column.

TABLE IV
[Superfractionator arrangement of Fig. 5.]

|  | Column No. 1 | Column No. 2 | Column No. 3 | Column No. 4 | Totals |
|---|---|---|---|---|---|
| Pressure above top tray, p.s.i.a | 28 | 28 | 17 | 33 | |
| Pressure below bottom tray, p.s.i.a | 37.2 | 37.2 | 27.0 | 38.1 | |
| Reflux ratio Lo/D | 40 | 40 | 80 | 40 | |
| Number of trays (75% eff.) | 80 | 80 | 87 | 44 | 291 |
| Height of column, ft | 127½ | 127½ | 138 | 73½ | |
| Diameter, ft | 6½ | 6½ | 11½ | 6½ | |
| Cross section, ft.² | 33.2 | 33.2 | 103.8 | 33.2 | |
| Area of trays and ends, ft.² | 2,720 | 2,720 | 9,240 | 1,530 | 16,210 |
| Perimeter (Pi D), ft | 20.4 | 20.4 | 36.1 | 20.4 | |
| Wall area, ft.² | 2,600 | 2,600 | 4,980 | 1,500 | 11,680 |
| Total Metal area, ft.² | 5,320 | 5,320 | 14,220 | 3,030 | 27,890 |
| Reboiler heat Supplied | No | No | Yes | Yes | |
|  |  |  |  |  | 72% |

Table IV prevents comparable results based on calculations for an arrangement of columns such as that illustrated in FIG. 5, wherein four columns are used and the operating pressures and reflux ratios are chosen for each from the ranges of operating characteristics given in Table I. The choice of conditions is made to reduce as far as possible the size of the vessels required without impairing the effectiveness of separation of the pure ethylbenzene product.

Other assumptions common to all three tables are made to place the results in a properly comparable basis. These are:

(1) The tray spacing is 18″ in each case.

(2) 7½ feet are allowed at each end of each column for disengaging and accumulation space.

(3) Perforated bubble trays are assumed.

(4) Performance of the installed trays is taken as being 75% of the effectiveness of a theoretical stage of separation for each bubble tray.

(5) Feed is a typical mixture of ethylbenzene and xylene isomers supplied at 181 mols per hour.

The advantages of the invention may now be illustrated by summarizing the results of the calculations from Tables II, III and IV, as follows:

TABLE V

|  | Table No. II | Table No. III | Table No. IV |
| --- | --- | --- | --- |
| Total metal area required, sq. ft | 38,780 | 36,845 | 27,890 |
| Total metal area as percentage of that required for the conventional arrangement of Table II | 100 | 95 | 72 |
| Total number of bubble trays | 261 | 278 | 291 |

The above table shows that the effect of operating the superfractionator as in Table III, in comparison with the conventional operation of Table II, is to reduce the size of the required vessels to the extent of 5% of the total metal area, whereas in the operation corresponding to Table IV, the reduction in size amounts to 28%.

The size reduction indicated in Table III has been achieved solely by virtue of segregation of the "pinch" section into the middle column of the three constituting the superfractionator, and then operating the two terminal columns, containing the rest of the trays, at higher pressures than the "pinch" column. The operating pressure for the "pinch" column is the same as that of column No. 1 of the conventional superfractionator, for which the data are listed in Table II. The larger reduction in vessel size indicated in Table IV is brought about by a substantial reduction in reflux ratios in those columns not holding the trays of the "pinch" section, superimposed upon the changes already considered in Table III. Some allowance is made in Tables II and III for the possibility that more trays may be required in the columns outside the "pinch" region to compensate for the low reflux ratios used there. However, no allowance is made in either of these two tables for the benefit that would accrue from improved relative volatilities of components present in the streams of the "pinch" and the stripping columns, which would result as a consequence of these columns operating at significantly lower pressures than they do in the conventional scheme associated with Table II. Because of the greater relative volatility between components, it may be expected that fewer trays would be needed in columns Nos. 3 and 4, in the operation illustrated in FIG. 5, than are indicated in Table IV. This would make the comparison of metal area requirements with those of the conventional superfractionator given in Table II more favorable than appears from the figures above.

Since the pressures at the bottoms of columns Nos. 3 and 4 are lower in the operation of FIG. 5, the reboilers associated with those columns will function at lower temperatures than are feasible in the conventional flow sheet for the superfractionator associated with Table II. This permits the use of less costly heating fluid for circulation in the reboilers, and reduces the hazard of thermal decomposition of heat-sensitive components of the mixture being separated in the fractionator.

Many modifications will be apparent to those skilled in the art. For instance, an installation in accordance with the invention may consist of three towers constituting a stripping section, a "pinch" section and a rectification section operating in series, with the feed being introduced into the stripping section. Each tower or selected towers will be provided with a condenser and a reboiler, although it is likely that there will be fewer condensers and reboilers than towers, and the towers will be divided to operate at different pressures and reflux ratios with the attendant advantages given above. The intermediate reboilers and condensers may be sized for the whole heat duty of their associated column, or may be sized for a lesser heat duty with pumping and compressing of the interchanging streams. The columns may or may not be of equal height, as long as the maximum reflux is concentrated in that part of the system containing the composition "pinch."

Where the pressure at the bottom of one column exceeds that at the top of the next adjacent column, heat exchange between the vapor and liquid streams flowing in opposite directions between the columns in the manner shown in FIG. 5 is desirable. However, further study might show that it would be more advantageous to achieve the same objective by exchange of heat with other streams that are available. For example, the vapor stream flowing between columns Nos. 3 and 2 in FIG. 5 in line 163 after its passage through exchanger 162 could be caused to exchange heat with the liquid stream leaving column No. 4. In this way, one or the other of exchangers 46 or 162 might be eliminated. If such an arrangement were used, the liquid flowing in line 52 from column No. 2 to column No. 3 in FIG. 5 could be used to exchange heat with the vapor flowing in line 96 between columns Nos. 2 and 1 either as a supplement to exchanger 150 or in place of it. It is evident that numerous such combinations are available in a system as complex as that described in this specification and the choice to be made in particular cases depends on the relative temperatures and heat quantities available in the streams flowing at the various points where it is feasible to make exchanges of heat. Consequently, the scope of this specification should not be restricted to the examples shown in FIGS. 1 through 5.

Preferably, the "pinch" column will operate at an optimum pressure at which the vessel's size will be a minimum, the reflux ratio being the same as would be required in all columns comprising a conventionally designed superfractionator. The remaining columns of the installation will operate at the highest pressure and the lowest reflux ratios which permit the desired separation of components to be made with an optimum balance between the size of the vessels and the amount of auxiliary equipment such as pumps, blowers and heat exchangers required to operate them.

As a further alternative, the controls of the reboilers and condensers can be associated so that the heat removals of the condensers are automatically adjusted to variations in the heat inputs by the reboilers, thereby securing the utmost efficiency of operation.

As has been indicated, in practice, the number of reboilers and condensers required will be less generally than the number of columns used in the superfractionator installation. The reboiler installation will thus consist of at least two units, one to provide the heat for operation of the stripping section and the second to operate the "pinch" and rectifying sections. Since it is contemplated that the stripping section will function at relatively low reflux ratios, the heat duty of its reboiler will be only a small fraction of the total required for the superfractionator. The reboiler associated with the "pinch" section will supply all the heat required by that section plus that required by the rectifying section. The heat duty of the latter reboiler will therefore be of about the same order of magnitude as the single reboiler of the conventional superfractionator installation or even slightly greater.

At least two condensers will generally be used, one at the top of the rectifying section and another at the top of the "pinch" section. The former condenses the pure overhead product and the reflux required in the rectifying section. Since the reflux ratio in the rectifying section is intended to be relatively small, the heat duty of this condenser is a small fraction of the total condensing duty required for the superfractionator. The heat used to vaporize the reflux in the rectifying section is, in general, supplied in the vapor stream entering the section from the top of the "pinch" section.

The condenser associated with the column containing the "pinch" section serves to condense reflux for that column plus that required in the stripping section, the reflux for the "pinch" section being vaporized in the "pinch" section reboiler and that of the stripping section in the reboiler attached to that column. The stripping section reflux is transferred as liquid from the bottom of the "pinch" section to the top of the stripping column having first been conveyed as vapor to the bottom of the "pinch" section from the top of the stripping column. The size of the "pinch" section condenser will, in general, be the same as that of a single condenser used in a conventional superfractionator installation or perhaps slightly larger.

An exception to the above will occur when it is found to be less costly to condense and re-vaporize each of the vapor streams than to transfer the streams as vapor by means of compressors, in which case the vapor leaving the top of each column would be completely condensed and then transferred as liquid to the reboiler of the next column in the series.

Although the "pinch" section has been associated in the ethylbenzene separation with the trays which show the maximum concentration of p-xylene, it may be that this will depend to some extent on the composition of the feed stream. That is, with different ratios between the concentrations of the four components in the feed, the "pinch" section may be limited by the maximum concentrations of m-xylene rather than those of p-xylene. It is probable, however, that the "pinch" section will always be between two trays showing maxima for the concentration of some component.

Other modifications within the scope and spirit of the invention as defined in the following claims will be apparent to those skilled in the art.

What is claimed is:

1. Apparatus for fractional distillation of $C_8$ aromatic components having little difference in relative volatilities comprising
   at least three separate fractionating columns constituting rectifying, "pinch" and stripping columns for said fractional distillation;
   means connecting said columns in series for flow of vapor from the top of one column to the bottom of the next column so that the vapor flow in each column is in an upwardly direction with the rectifying column constituting the last column and the stripping column the first, means flowing liquid from the bottom of the rectifying column to the top of said "pinch" column and from the bottom of the "pinch" column to the top of the stripping column, the liquid flow being in a countercurrent direction in each column and from the last column to the first;
   means for reboiling a portion of the bottoms liquid stream of said "pinch" column, means for condensing a portion of the vapor overhead stream of said "pinch" column, the "pinch" column and condenser means therefor being sized such that the reflux rate for the "pinch" column is near the minimum required to achieve separation of the components, means to control the pressure of the "pinch" column at a constant value;
   means for condensing the vapor overhead product of the rectifying column, means for controlling the pressure of the rectifying column at a constant value independent of the pressure in the "pinch" column, said rectifying column being sized in diameter and plurality of trays for operation at a low reflux ratio and at a high pressure relative to the reflux ratio and pressure of said "pinch" column;
   reboiler means for reboiling a portion of the bottoms stream of the stripping column, means for controlling the pressure of the stripping column at a constant value independent of the pressure in the "pinch" column, and means to control the reflux flow to the stripping column, said stripping column also being sized in diameter and plurality of trays for operation at a low reflux ratio and at a high pressure relative to the reflux ratio and pressure of said "pinch" column.

2. Apparatus for fractional distillation in accordance with claim 1 wherein the rectifying column comprises first and second distillation columns operatively connected in series with the flow of liquid downwardly in each column and from the bottom of the second column to the top of the first and with countercurrent flow of vapor, the means for condensing the vapor overhead product of the rectifying column being associated with the top of said second column, and the liquid flow to the "pinch" column being from the bottom of the first column, further including means for controlling the rate of reflux flow from the bottom of said second rectifying column to the top of the first rectifying column.

3. Apparatus for fractional distillation in accordance with claim 1 wherein said reboiler means for the stripping column is sized for a heat duty approximating the heat requirements for this column only.

4. Apparatus for fractional distillation in accordance with claim 1, wherein the reflux ratio for the "pinch" column is a value in the range of 1.15 to 1.25 times the minimum reflux ratio required for separation of said components, this value being applied only to the "pinch" column.

5. Apparatus for fractional distillation in accordance with claim 1, further including means to introduce a feed stream into the "pinch" column at a point of entry in the column, and means for preheating the feed stream to a temperature equal to or slightly above the bubble point of the feed at the pressure prevailing in the "pinch" column at said point of entry.

6. Apparatus for fractional distillation in accordance with claim 1, wherein the reflux for the "pinch" column is obtained in part from the rectifying column and in part from the condenser means for the "pinch" column, said apparatus further including means for intermixing said parts, and means to introduce said intermixed parts into the "pinch" column above the top tray thereof, said parts being intermixed in a ratio so that the temperature of the resultant reflux is low enough to avoid flash vaporization of the reflux in the "pinch" column.

7. Apparatus for fractional distillation of $C_8$ aromatic components having little difference in relative volatilities comprising
   at least three separate fractionating columns constituting rectifying, "pinch" and stripping columns for said fractional distillation;

means operatively connecting the said columns in series for flow of reflux downwardly in each column and from the bottom of the rectifying column to the top of the "pinch" column and from the bottom of the "pinch" column to the top of the stripping column and countercurrent flow of vapor from the top of the stripping column to the bottom of the "pinch" column and from the top of the "pinch" column to the bottom of the rectifying column;

condenser means for condensing the vapor overhead product of the rectifying column and returning at least a portion of said product to the column as reflux;

reboiler means for reboiling a portion of the bottoms stream of the stripping column and for returning said portion as vapor to the column;

a partial condenser means at the top of the "pinch" column for condensing at least a portion of the overhead stream of the "pinch" column, said condensed stream and bottoms flow from the rectifying column constituting reflux for the "pinch" column;

means for controlling the reflux ratio for the "pinch" column so that it is from 1.15 to 1.25 times the minimum reflux ratio required for separation of the components;

a partial reboiler means at the bottom of the "pinch" column for reboiling a portion of the bottoms of the "pinch" column;

means for maintaining constant pressures in each of the columns;

means for controlling the reflux ratio in said rectifying and stripping columns;

the rectifying and stripping columns being sized in diameter and plurality of trays for operation at a low reflux ratio and at a high pressure relative to the reflux ratio and pressure of said "pinch" column.

8. Apparatus according to claim 7 further including means for maintaining the streams flowing between said columns at temperatures and pressures compatible with those of the regions to which they are directed.

9. A method for fractional distillation of $C_8$ aromatic components in a distillation column having an intermediate "pinch" region of relaively constant composition and rectifying and stripping regions above and below, respectively, the "pinch" region, comprising the steps of withdrawing an overhead product from the rectifying region and refluxing a portion thereof for further fractionation;

withdrawing a bottoms product from the stripping region and reboiling at least a portion thereof to produce a vapor stream for countercurrent flow relative to said reflux stream;

withdrawing an intermediate vapor stream from the top of said "pinch" region and condesing at least a portion thereof;

combining said condensed portion and bottoms flow from the rectifying region, the combined flow constituting reflux for the "pinch" region;

withdrawing an intermediate liquid stream from the bottom of said "pinch" region, reboiling at least a portion thereof and returning the vapor to the "pinch" region;

the portions not condensed and not vaporized being passed to the rectifying and stripping regions respectively for countercurrent flow with the liquid and vapor streams in said regions;

controlling the reflux ratio for said "pinch" region so that it is from 1.15 to 1.25 times the minimum reflux ratio required for separation of the components;

and carrying out the separations in said rectifying and stripping regions at pressures which are high relative to the pressure in the "pinch" region and at reflux ratios which are low relative to the "pinch" region.

References Cited by the Examiner

UNITED STATES PATENTS

| 2,361,493 | 10/1944 | Patterson | 202—39.5 |
| 2,581,051 | 1/1952 | Smith | 203—100 |
| 2,842,484 | 7/1958 | Fleck | 202—39.5 |
| 2,959,626 | 11/1960 | Krausse et al. | 202—39.5 |
| 2,961,383 | 11/1960 | Black | 260—674 |
| 2,971,036 | 2/1961 | James | 260—681.5 |
| 3,105,017 | 9/1963 | Amir et al. | 202—39.5 |

OTHER REFERENCES

Encyclopedia of Chemical Technology, Interscience Inc., N.Y., vol. 5, pp. 165–168 (1950 ed.).

NORMAN YUDKOFF, *Primary Examiner.*

F. E. DRUMMOND, *Assistant Examiner.*

UNITED STATES PATENT OFFICE
CERTIFICATE OF CORRECTION

Patent No. 3,281,337            October 25, 1966

Leonard W. Zahnstecher et al.

It is hereby certified that error appears in the above numbered patent requiring correction and that the said Letters Patent should read as corrected below.

Column 3, line 66, for "resignated" read -- designated --; column 7, line 4, for "temperature" read -- pressure --; column 15, line 1, for "prevents" read -- presents --; column 19, line 45, for "relaively" read -- relatively --; column 20, line 9, for "condesing" read -- condensing --.

Signed and sealed this 5th day of September 1967.

(SEAL)
Attest:

ERNEST W. SWIDER            EDWARD J. BRENNER
Attesting Officer            Commissioner of Patents